United States Patent
Woo et al.

(10) Patent No.: US 10,838,724 B2
(45) Date of Patent: *Nov. 17, 2020

(54) ACCESSING DATA IN MULTI-DIMENSIONAL TENSORS

(71) Applicant: Google LLC, Mountain View, CA (US)

(72) Inventors: Dong Hyuk Woo, San Jose, CA (US); Andrew Everett Phelps, Middleton, WI (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/298,535

(22) Filed: Mar. 11, 2019

(65) Prior Publication Data

US 2019/0205141 A1    Jul. 4, 2019

Related U.S. Application Data

(63) Continuation of application No. 15/844,192, filed on Dec. 15, 2017, now Pat. No. 10,228,947, which is a
(Continued)

(51) Int. Cl.
*G06F 9/302* (2018.01)
*G06F 9/355* (2018.01)
(Continued)

(52) U.S. Cl.
CPC ............ *G06F 9/355* (2013.01); *G06F 9/3001* (2013.01); *G06F 9/30036* (2013.01);
(Continued)

(58) Field of Classification Search
CPC .... G06F 9/355; G06F 9/3001; G06F 9/30036; G06F 9/30054; G06F 9/30061;
(Continued)

(56) References Cited

U.S. PATENT DOCUMENTS 5,375,238 A    12/1994 Ooi
5,958,048 A    9/1999 Babaian
(Continued)

FOREIGN PATENT DOCUMENTS

CN    1492316 A    4/2004
CN    103440513    12/2013
(Continued)

OTHER PUBLICATIONS

"LOOP/LOOPcc: Loop According to ECX Counter," retrieved on Dec. 23, 2015, retrieved from the Internet: URL<http://x86.renejeschke.de/html/file_module_x86_id_161.html>, 1 page.
(Continued)

*Primary Examiner* — Daniel H Pan
(74) *Attorney, Agent, or Firm* — Fish & Richardson P.C.

(57) ABSTRACT

Methods, systems, and apparatus, including an apparatus for processing an instruction for accessing a N-dimensional tensor, the apparatus including multiple tensor index elements and multiple dimension multiplier elements, where each of the dimension multiplier elements has a corresponding tensor index element. The apparatus includes one or more processors configured to obtain an instruction to access a particular element of a N-dimensional tensor, where the N-dimensional tensor has multiple elements arranged across each of the N dimensions, and where N is an integer that is equal to or greater than one; determine, using one or more tensor index elements of the multiple tensor index elements and one or more dimension multiplier elements of the multiple dimension multiplier elements, an address of the particular element; and output data indicating the determined address for accessing the particular element of the N-dimensional tensor.

20 Claims, 11 Drawing Sheets

Related U.S. Application Data continuation of application No. 15/456,812, filed on Mar. 13, 2017, now Pat. No. 9,875,100, which is a continuation of application No. 15/014,265, filed on Feb. 3, 2016, now Pat. No. 9,875,104.

(51) Int. Cl.

| | | |
|---|---|---|
| *G06F 17/16* | (2006.01) | |
| *G06F 9/30* | (2018.01) | |
| *G06F 9/345* | (2018.01) | |
| *G06F 9/38* | (2018.01) | |
| *G06F 9/32* | (2018.01) | |

(52) U.S. Cl.
CPC ...... *G06F 9/30054* (2013.01); *G06F 9/30061* (2013.01); *G06F 9/30065* (2013.01); *G06F 9/30101* (2013.01); *G06F 9/325* (2013.01); *G06F 9/3455* (2013.01); *G06F 9/3555* (2013.01); *G06F 9/3836* (2013.01); *G06F 17/16* (2013.01); *G06F 2212/454* (2013.01)

(58) Field of Classification Search
CPC .. G06F 9/30065; G06F 9/30101; G06F 9/325; G06F 9/3455; G06F 9/3555; G06F 17/16; G06F 2212/454
USPC ....... 712/221–225, 2–22; 708/514, 520, 523, 708/607
See application file for complete search history.

(56) References Cited

U.S. PATENT DOCUMENTS

| | | | |
|---|---|---|---|
| 6,647,484 B1* | 11/2003 | Jiang | G06F 9/345 |
| | | | 711/110 |
| 8,448,157 B2 | 5/2013 | Mitran et al. | |
| 8,539,211 B2 | 9/2013 | Hoogerbrugge | |
| 8,806,183 B1 | 8/2014 | Yearsley | |
| 8,817,026 B1 | 8/2014 | Zimmerman | |
| 8,904,155 B2 | 12/2014 | Dieffenderfer et al. | |
| 9,710,265 B1 | 7/2017 | Temam et al. | |
| 9,875,100 B2* | 1/2018 | Woo | G06F 9/30101 |
| 9,875,104 B2* | 1/2018 | Woo | G06F 9/30061 |
| 10,228,947 B2* | 3/2019 | Woo | G06F 9/30036 |
| 2001/0021972 A1 | 9/2001 | Topham | |
| 2004/0034754 A1 | 2/2004 | Schreiber | |
| 2004/0088529 A1* | 5/2004 | Schreiber | G06F 30/30 |
| | | | 712/245 |
| 2004/0093550 A1* | 5/2004 | Kadatch | H03M 13/15 |
| | | | 714/752 |
| 2004/0187102 A1* | 9/2004 | Garthwaite | G06F 8/443 |
| | | | 717/160 |
| 2008/0195851 A1 | 8/2008 | Hoogerbrugge | |
| 2008/0301697 A1 | 12/2008 | Southgate | |
| 2010/0122066 A1 | 5/2010 | Fischer | |
| 2010/0169612 A1 | 7/2010 | Persson et al. | |
| 2010/0274972 A1 | 10/2010 | Babayan et al. | |
| 2011/0107068 A1 | 5/2011 | Mitran et al. | |
| 2013/0185540 A1 | 7/2013 | Gun Ching-Yu et al. | |
| 2014/0181171 A1 | 6/2014 | Dourbal | |
| 2014/0188961 A1 | 7/2014 | Plotnikov et al. | |
| 2017/0200094 A1 | 7/2017 | Bruestle | |
| 2017/0220352 A1 | 8/2017 | Woo et al. | |

FOREIGN PATENT DOCUMENTS

| | | |
|---|---|---|
| CN | 104838357 A | 8/2015 |
| CN | 105260322 A | 1/2016 |
| WO | WO 2001/90888 | 11/2001 |
| WO | WO 2013/095601 | 6/2013 |
| WO | WO-2017201627 | 11/2017 |

OTHER PUBLICATIONS

Baumgartner et al., "Synthesis of High-Performance Parallel Programs for a Class of *Ab Initio* Quantum Chemistry Models," Proceedings of the IEEE, 93(2):276-292, Feb. 2005.
Cociorva et al., "Loop Optimizations for a Class of Memory-Constrained Computations," ICS '01 Proceedings of the 15th international conference on Supercomputing, pp. 103-113, 2001.
Extended European Search Report issued in European Application No. 16207511.3, dated Oct. 4, 2018, 18 pages.
GB Search and Examination Report issued in the United Kingdom Application No. GB1812820.7, dated Mar. 22, 2019, 7 pages.
Partial European Search Report issued in European Application No. 16207511.3, dated Jun. 5, 2018, 17 pages.
CN Office Action in Chinese Application No. 201910630145, dated Mar. 2, 2020, 10 pages (with English translation).
BR Office Action in Brazilian Application No. 1020160308259, dated Jul. 30, 2020, 8 pages (with English translation).
IN Office Action in Indian Application No. 201644044809, dated Jul. 31, 2020, 8 pages (with English translation).
JP Office Action in Japanese Application No. 2016-250976, dated Sep. 1, 2020, 7 pages (with English translation).

* cited by examiner

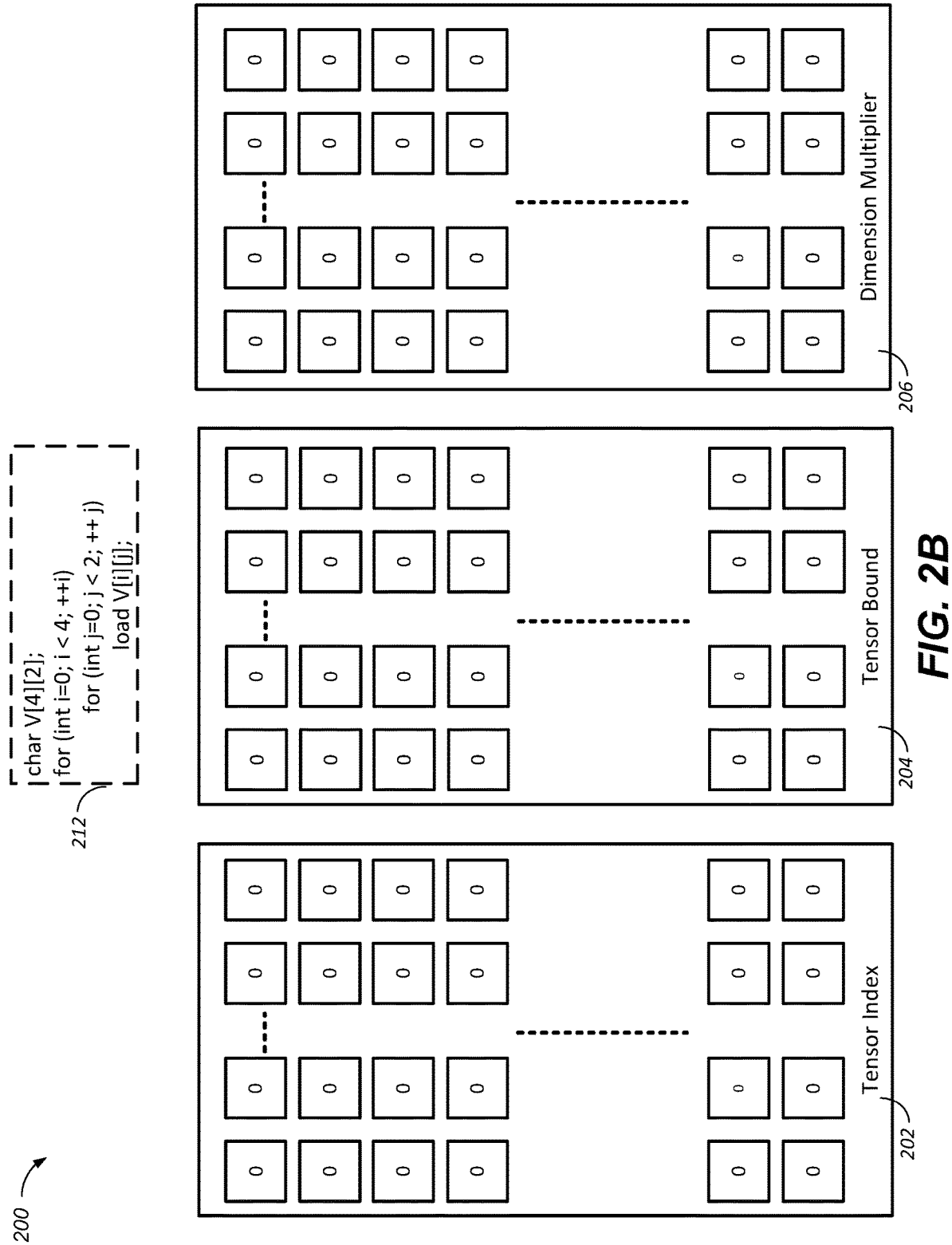

ACCESSING DATA IN MULTI-DIMENSIONAL TENSORS

CROSS REFERENCE TO RELATED APPLICATIONS

This application is a continuation of U.S. patent application Ser. No. 15/844,192, now U.S. Pat. No. 10,228,947, filed on Dec. 15, 2017, which is a continuation of U.S. patent application Ser. No. 15/456,812, now U.S. Pat. No. 9,875,100, filed on Mar. 13, 2017, which is a continuation of U.S. patent application Ser. No. 15/014,265, now U.S. Pat. No. 9,875,104, filed on Feb. 3, 2016. The prior applications are incorporated herein by reference in their entirety.

BACKGROUND

This specification generally relates to using registers for computing memory address values. Registers may be used to handle branch conditions.

SUMMARY

According to one innovative aspect of the subject matter described in this specification, registers can be used to iterate nested loop structures, to compute corresponding memory addresses, and to allow programmers to handle loop bound conditions. In general, registers may be arranged to maintain several sets of architectural status, including loop bound values, a current loop index variable in each loop, dimension multipliers for computing a memory address value, and program counter values for handling branch loop bounds. The arrangement may be good for processing one or more multi-dimensional data structures. With these architectural status sets, a processor may execute instructions to move index variables to new positions, retrieve memory address values, and to jump to a new branch target.

In general, one innovative aspect of the subject matter described in this specification can be embodied in an apparatus for processing an instruction for accessing a N-dimensional tensor. The apparatus includes multiple tensor index elements and multiple dimension multiplier elements, where each of the dimension multiplier elements has a corresponding tensor index element. The apparatus includes one or more processors configured to obtain an instruction to access a particular element of a N-dimensional tensor, where the N-dimensional tensor has multiple elements arranged across each of the N dimensions, and where N is an integer that is equal to or greater than one; determine, using one or more tensor index elements of the multiple tensor index elements and one or more dimension multiplier elements of the multiple dimension multiplier elements, an address of the particular element; and output data indicating the determined address for accessing the particular element of the N-dimensional tensor.

These and other implementations can each optionally include one or more of the following features. For example, the address of the particular element may be an address offset from another element of the N-dimensional tensor. To determine the address of the particular element, for each tensor index element of the one or more tensor index elements, a value stored in the respective tensor index element may be multiplied by a value stored in the corresponding tensor index element of the one or more multiple tensor index elements to generate a respective multiplied value. The address offset may be determined by determining a sum of the multiplied values.

The multiple tensor index elements may be arranged into M groups of tensor index elements, M being a positive integer greater than one. Each group of tensor index elements may be assigned to a distinct and different multi-dimensional tensor.

The apparatus may include multiple tensor bound elements, where each of the multiple tensor bound elements may have a corresponding tensor index element in the multiple tensor index elements. The instruction may represent an instruction for processing a nested loop that includes a first loop and a second loop that is an outer loop of the first loop, where the first loop is iterated using a first index variable, and where the second loop is iterated using a second index variable.

The one or more processors may be configured to set values stored in the multiple tensor index elements, the multiple dimension multiplier elements, and the multiple tensor bound elements to an initialization value. The one or more processors may be configured to set a value stored in a first tensor bound element of the multiple tensor bound elements to an upper bound value of the first index variable for iterating the first loop; set a value stored in a second tensor bound element of the multiple tensor bound elements to an upper bound value of the second index variable for iterating the second loop; set a value stored in a first dimension multiplier element of the multiple dimension multiplier elements to a predetermined value; and set a value stored in a second dimension multiplier element of the multiple dimension multiplier elements to the upper bound value of the first index variable.

To determine the address of the element of the N-dimensional tensor, the one or more processors may be configured to set a value stored in a first tensor index element of the multiple tensor index elements to a current value of the first index variable; set a value stored in a second tensor index element of the multiple tensor index elements to a current value of the second index variable; multiply the value stored in the first dimension multiplier element by the value stored in the first tensor index element to obtain a first multiplied value; multiply the value stored in the second dimension multiplier element by the value stored in the second tensor index element to obtain a second multiplied value; and determine the address by at least summing the first multiplied value and the second multiplied value.

The one or more processors may be configured to receive an instruction to update the value stored in the first tensor index element; after receiving the instruction to update the value stored in the first tensor index element, determining that a difference between the value stored in the first tensor index element and the value stored in the first tensor bound element satisfies a threshold; and in response to determining that the difference between the value stored in the first tensor index element and the value stored in the first tensor bound element satisfies the threshold, updating the value stored in the first tensor index element. The first index variable may be incremented by a first incremental value each time the first loop completes. To update the value stored in the first tensor index element, the value stored in the first tensor index element may be incremented by the first incremental value.

The one or more processors may be configured to receive an instruction to update the value stored in the first tensor index element; after receiving the instruction to update the value stored in the first tensor index element, determining that a difference between the value stored in the first tensor index element and the value stored in the first tensor bound element does not satisfy a threshold. In response to determining that the difference between the value stored in the first tensor index element and the value stored in the first tensor bound element does not satisfy the threshold, the one or more processors may be configured to reset the value stored in the first tensor index element, and update the value stored in the second tensor index element. The second index variable may be incremented by a second incremental value each time the second loop completes. To update the value stored in the second tensor index element, the value stored in the second tensor index element may be incremented by the second incremental value.

The one or more processors may include one or more arithmetic logic units. Each of the tensor index elements and the dimension multiplier elements may be a register. The apparatus may include multiple branch target elements, where each of the multiple branch target elements has a corresponding tensor index element in the multiple tensor index elements, and where each of the multiple branch target elements is configured to store an address for an instruction to be executed upon a completion of an iteration of a loop that corresponds to the respective branch target element.

The subject matter described in this specification can be implemented in particular embodiments so as to realize one or more of the following advantages. Using registers to keep track of memory address values allow a program to iterate deeply-nested loops with one instruction. Memory address values can be quickly determined by applying simple arithmetic calculations based on the values stored in the registers. Determining memory address values using arithmetic logic units allows the number of computational cycles at the processor to be reduced, and increases processor bandwidth for other computation tasks. Tensors can be traversed with a reduced number of instructions. A two-dimension register architecture allows multi-dimensional tensors each having different dimensions to be tracked concurrently. By having branch target tables, branch instruction-related overhead can be reduced.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIGS. 2A-2H illustrate an example tensor traversal unit.

Like reference numbers and designations in the various drawings indicate like elements.

DETAILED DESCRIPTION

In general, when a software algorithm processes an N-dimensional tensor, a nested loop may be used, where each loop is responsible for traversing each dimension of the N-dimensional tensor. A multi-dimensional tensor may be a matrix, or multi-dimensional matrices. Each dimension of the N-dimensional tensor may include one or more elements, where each element may store a respective data value. For example, a tensor may be a variable in a program, where the variable may have three dimensions. The first dimension may have a length of three hundred elements, the second dimension may have a length of thousand elements, and the third dimension may have a length of twenty elements. Traversing the tensor in a nested loop requires a computation of a memory address value of an element to load or store the corresponding data value of the element. For example, a for-loop is a nested loop, where three loops tracked by three loop index variables can be nested to traverse through the three-dimensional tensor. In some cases, a processor may need to execute a loop bound condition, such as setting a loop bound of an inner loop with an outer loop index variable. For example, in determining whether to exit the inner-most loop of a nested loop, the program may compare the current value of the loop index variable of the inner-most loop with the current value of the loop index variable of the outer-most loop of the nested loop.

These tasks may require a significant number of instructions such as branch instructions and integer arithmetic instructions. When each loop bound is small and the number of loops is large, the computation may take a significant portion of the overall execution time, and seriously degrade overall performance. For example, a processor may be designed to process N-dimensional tensor input. The processor may be implemented on a 2-dimensional architecture, which leaves (N−2) dimensions to be processed by software. When N is large, the handling of the N−2 dimensions may be computationally heavy for the processor because the computation requires very high scalar computation bandwidth. A hardware tensor traversal unit for a processor may increase the computation bandwidth of the processor by reducing the number of dimensions that the processor is required to process when traversing a tensor.

Figure 1:
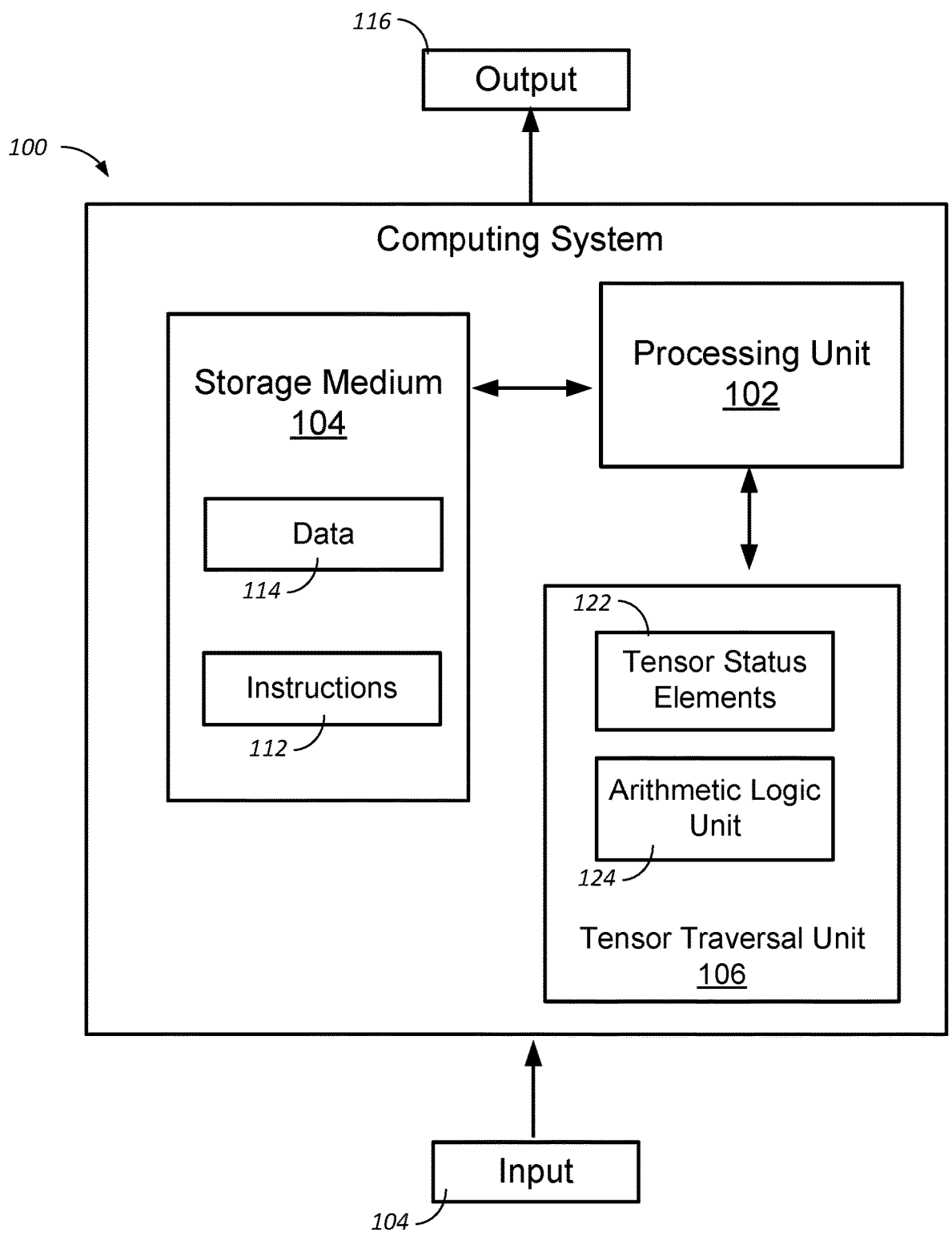
FIG. 1 is a block diagram of an example computation system.

FIG. 1 shows a block diagram of an example computing system 100 for traversing a tensor. In general, the computing system 100 processes an input 104 to generate an output 116. The computing system 100 may be configured to perform linear algebra computations. The input 104 may be any suitable data that can be processed by the computing system 100. The computing system 100 includes a processing unit 102, a storage medium 104, and a tensor traversal unit 106.

In general, when the processing unit 102 executes an instruction for accessing a particular element of a tensor, the tensor traversal unit 106 determines the address of the particular element of the tensor, such that the processing unit 102 may access the storage medium 104 to read data 114 representing the value of the particular element. For example, a program may include a nested loop and the processing unit 102 may execute an instruction to access an element of a two-dimensional array variable within the nested loop according to current index variable values associated with the nested loop. Based on the current index variable values associated with the nested loop, the tensor traversal unit 106 may determine an offset value that represents an offset from a first element of the two-dimensional array variable. The processing unit 102 may then access, using the offset value and from the storage medium, the particular element of the two-dimensional array variable.

The processing unit 102 is configured to process instructions for execution within the computing system 100, including instructions 112 stored in the storage medium 104 or other instructions stored in another storage device. The processing unit 102 may include one or more processors. The storage medium 104 stores information within the computing system 100. In some implementations, the storage medium 104 is a volatile memory unit or units. In some other implementations, the storage medium 104 is a non-volatile memory unit or units. The storage medium 104 may also be another form of computer-readable medium, such as a floppy disk device, a hard disk device, an optical disk device, or a tape device, a flash memory or other similar solid state memory device, or an array of devices, including devices in a storage area network or other configurations. The instructions, when executed by the processing unit 102, cause the processing unit 102 to perform one or more tasks.

The tensor traversal unit 106 is configured to determine a status associated with one or more tensors. The status may include loop bound values, current loop index variable values, dimension multipliers for computing a memory address value, and/or program counter values for handling branch loop bounds. The tensor traversal unit 106 includes tensor status elements 122 and an arithmetic logic unit 124. Each of the tensor status elements 122 may be a storage element, for example a register or any other suitable storage circuitry. In some implementations, the tensor status elements 122 may be physically or logically arranged into different groups, as described in more detail below with reference to FIGS. 2A-2H and FIGS. 3A-3B. In some implementations, a group of the tensor status elements 122 may be physically or logically arranged into a multi-dimension array. For example, each group of the tensor status elements 122 may be physically or logically arranged into a two-dimensional array. The arithmetic logic unit 124 includes one or more arithmetic logic units (ALUs) that are configured to perform arithmetic and logic operations. For example, the arithmetic logic unit 124 may include digital circuitry that is configured to perform addition, subtraction, multiplication, division, logic AND, logic OR, or any other suitable arithmetic and logic operations.

Figure 2A:
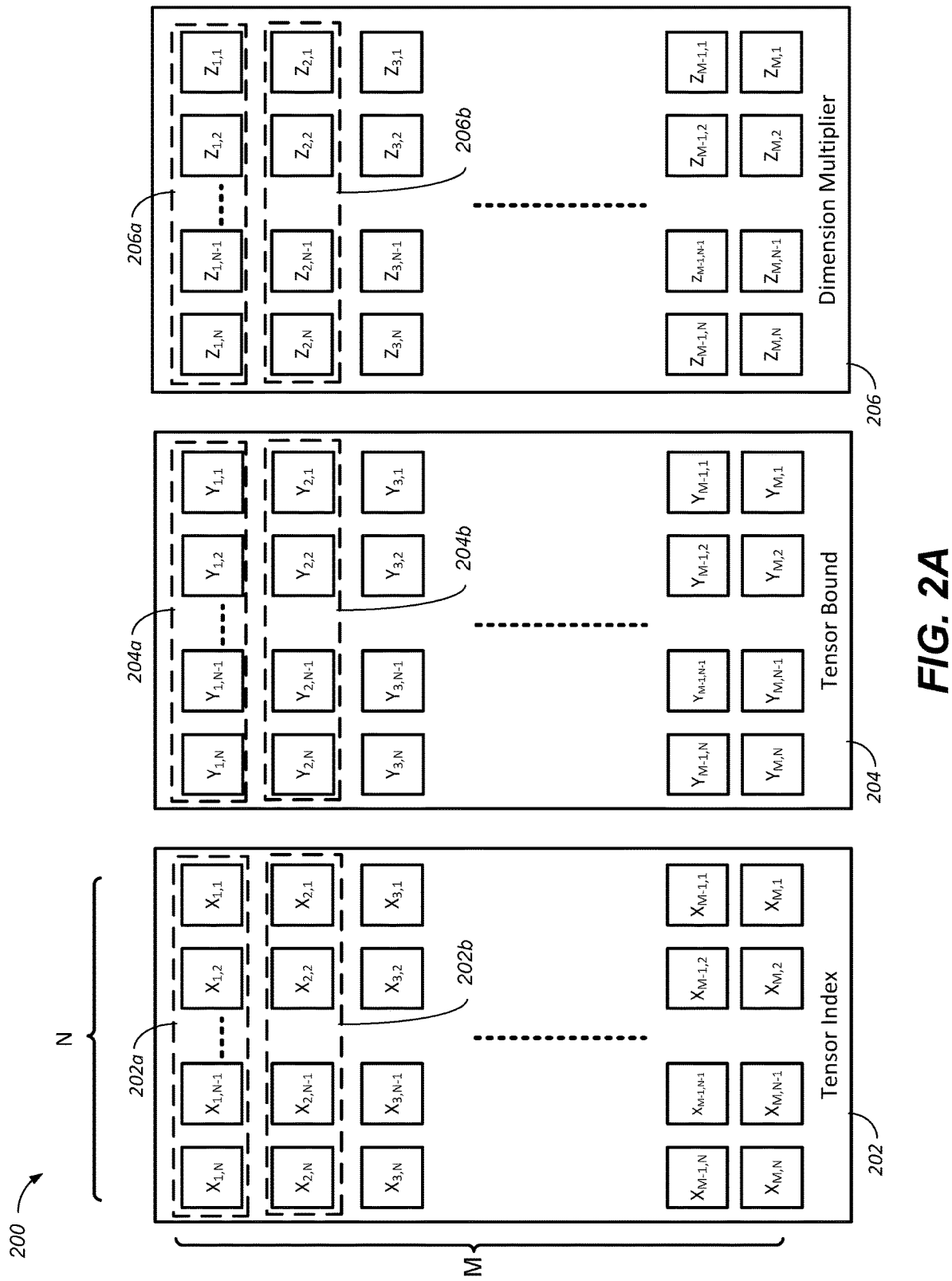

FIG. 2A shows an example set of tensor status elements 200 of a tensor traversal unit. The tensor status elements 200 may correspond to the tensor status elements 122 of the tensor traversal unit 106. The tensor traversal unit 200 includes a group of tensor index elements 202, a group of tensor bound elements 204, and a group of dimension multiplier elements 206. The tensor index elements 202 may be physically or logically arranged as a 2-D array having M rows and N columns, where M and N are integers greater than or equal to one. In some implementations, each row of the tensor index elements 202 may represent tensor index information for a tensor. For example, if a program defines two array variables V1 and V2, the tensor traversal unit may assign rows 202a and 202b to track the tensor index information for array variables V1 and V2, respectively. In some implementations, each column of the tensor index elements 202 may represent tensor index information for nested loop index variable values that are associated with a tensor. For example, if the program defines a nested loop having three loops for accessing the variable V1, where each loop of the nested loop is indexed by nested loop index variables i, j, and k, the tensor traversal unit may assign tensor index element $X_{1,1}$, $X_{1,2}$, and $X_{1,3}$ to track the nested loop index variable i, j, and k, respectively. The tensor index information is described in more detail below with reference to FIGS. 2D-2H below.

The tensor bound elements 204 may be physically or logically arranged as a 2-D array having the same dimensions as the tensor index elements 202, where each element of the tensor bound elements 204 has a corresponding element in the tensor index elements 202. In some implementations, each row of the tensor bound elements 204 may represent tensor bound information for a tensor. For example, if the program defines two array variables V1 and V2, the tensor traversal unit may assign rows 204a and 204b to track the tensor bound information for array variables V1 and V2, respectively. In some implementations, each column of the tensor bound elements 204 may represent tensor bound information for nested loop index variable values that are associated with a tensor. For example, if the program defines a nested loop having three loops for accessing the variable V1, where each loop of the nested loop is indexed by nested loop index variables i, j, and k, the tensor traversal unit may assign tensor bound element $Y_{1,1}$, $Y_{1,2}$, and $Y_{1,3}$ to track the tensor bound information associated with the nested loop index variables i, j, and k, respectively. The tensor bound information is described in more detail below with reference to FIG. 2C below.

The dimension multiplier elements 206 may be physically or logically arranged as a 2-D array having the same dimensions as the tensor index elements 202, where each element of the dimension multiplier elements 206 has a corresponding element in the tensor index elements 202. In some implementations, each row of the dimension multiplier elements 206 may represent dimension multiplier information for a tensor. For example, if the program defines two array variables V1 and V2, the tensor traversal unit may assign rows 206a and 206b to track the dimension multiplier information for array variables V1 and V2, respectively. In some implementations, each column of the dimension multiplier elements 206 may represent dimension multiplier information for nested loop index variable values that are associated with a tensor. For example, if the program defines a nested loop having three loops for accessing the variable V1, where each loop of the nested loop is indexed by nested loop index variables i, j, and k, the tensor traversal unit may assign dimension multiplier elements $Z_{1,1}$, $Z_{1,2}$, and $Z_{1,3}$ to track the dimension multiplier information associated with the nested loop index variables i, j, and k, respectively. The dimension multiplier information is described in more detail below with reference to FIG. 2D below.

FIGS. 2B-2H show an example of how the tensor status elements 200 may be used by a tensor traversal unit to process a tensor. Referring to FIG. 2B, a program 212 may be stored in the storage medium 104 or another storage medium that can be executed by the processing unit 102. The program 212 specifies a character array variable V having a first dimension of 4 and a second dimension of 2. The program 212 specifies a nested for-loop for traversing the variable V, where the for-loop traverses the first dimension of V in an outer loop tracked by a nested loop index variable i, and traverses the second dimension of V in an inner loop tracked by a nested loop index variable j. In some implementations, the tensor status elements 200 may be initialized at the beginning of a program. For example, a processor may execute an instruction "InitializeElements" that initializes the tensor status elements 200. The instruction may be a hardware instruction of an instruction set executable by a processor. In some implementations, after initialization, each element of the tensor status elements 200 is set to a predetermined value. Here, after initialization, each element of the tensor status elements 200 may be set to zero.

Figure 2C:
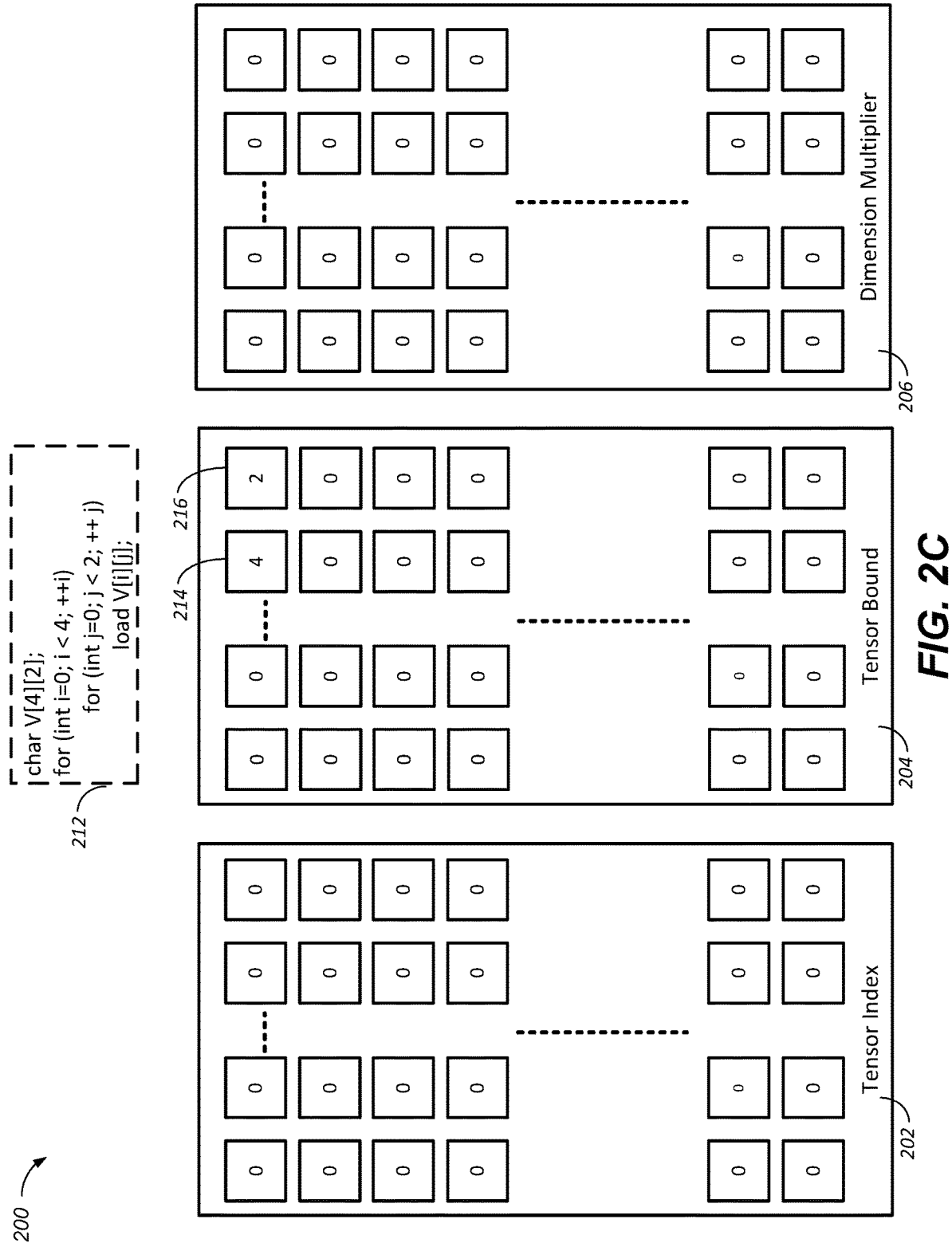

FIG. 2C illustrates setting tensor bound information in the tensor bound elements 204 according to the program 212. For example, a processor may execute an instruction "SetTensorBound" that sets tensor bound information in the tensor bound elements 204. In some implementations, the tensor bound information represents an upper bound of the corresponding nested loop index variable. Here, the inner nested loop index variable i has an upper bound of 4, and the outer nested loop index variable j has an upper bound of 2. After setting tensor bound information in the tensor bound elements 204, the element 214 (i.e., $Y_{1,2}$) is set to 4, and the element 216 (i.e., $Y_{1,1}$) is set to 2.

Figure 2D:
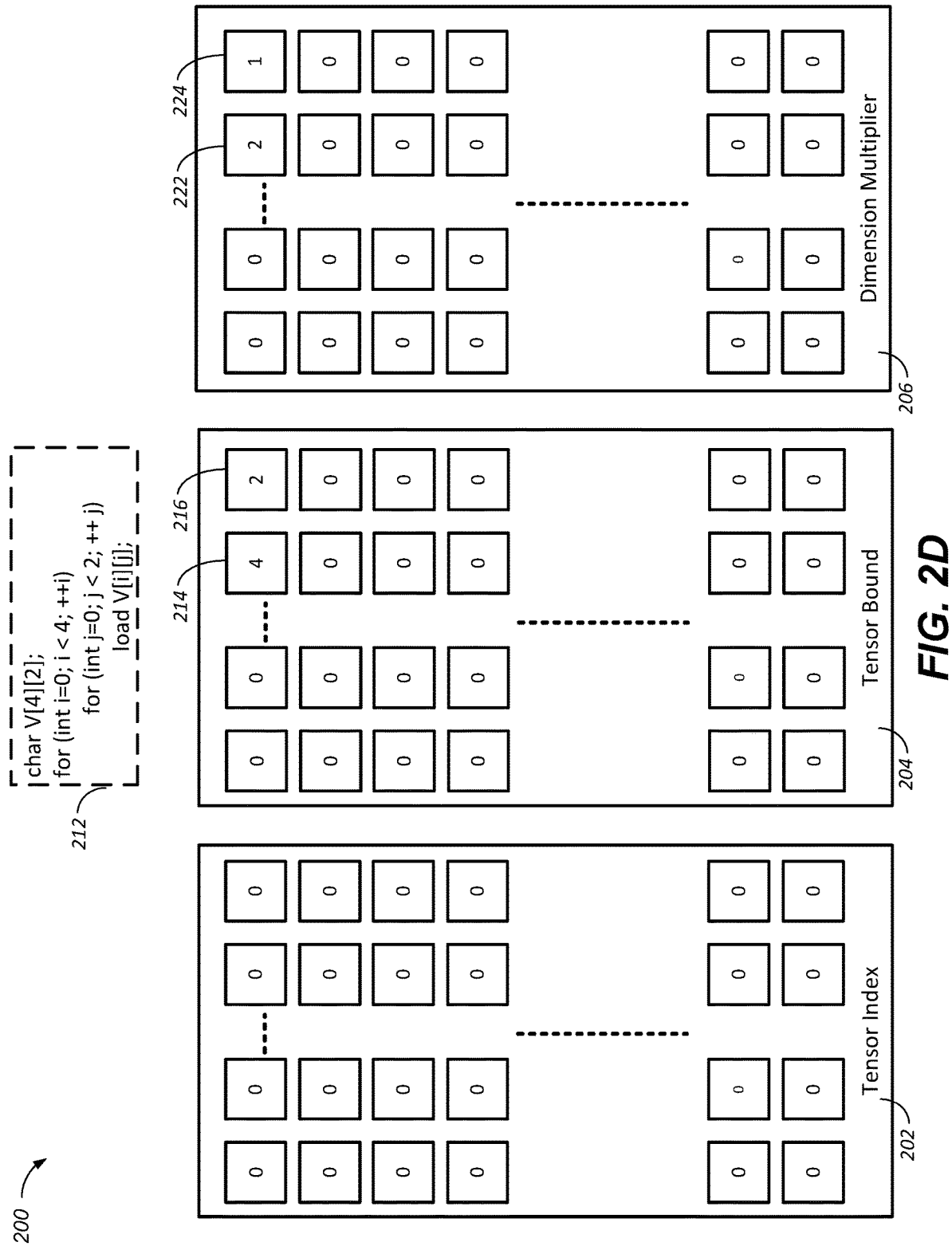

FIG. 2D illustrates setting dimension multiplier information in the dimension multiplier elements 206 according to the program 212. For example, the processor may execute an instruction "SetDimensionMultiplier" that sets dimension multiplier information in the dimension multiplier elements 206. In some implementations, the dimension multiplier information represents a multiplier that a corresponding element in the tensor index elements 202 may be multiplied by. Here, the character variable V has a first dimension of 4 and a second dimension of 2. If the element V[0][0] is stored at a base memory address P and the element V[0][1] is stored at a memory address P+1, the element V[1][0] is stored at a memory address P+2. The corresponding memory address for an element V[i][i] is therefore P+(i×2)+(j×1). Thus, the dimension multiplier information for the outer loop is 2, and the dimension multiplier information for the inner loop is 1. After setting dimension multiplier information in the dimension multiplier elements 206, the element 222 (i.e., $Z_{1,2}$) is set to 2, and the element 224 (i.e., $Z_{1,1}$) is set to 1.

Figure 2E:
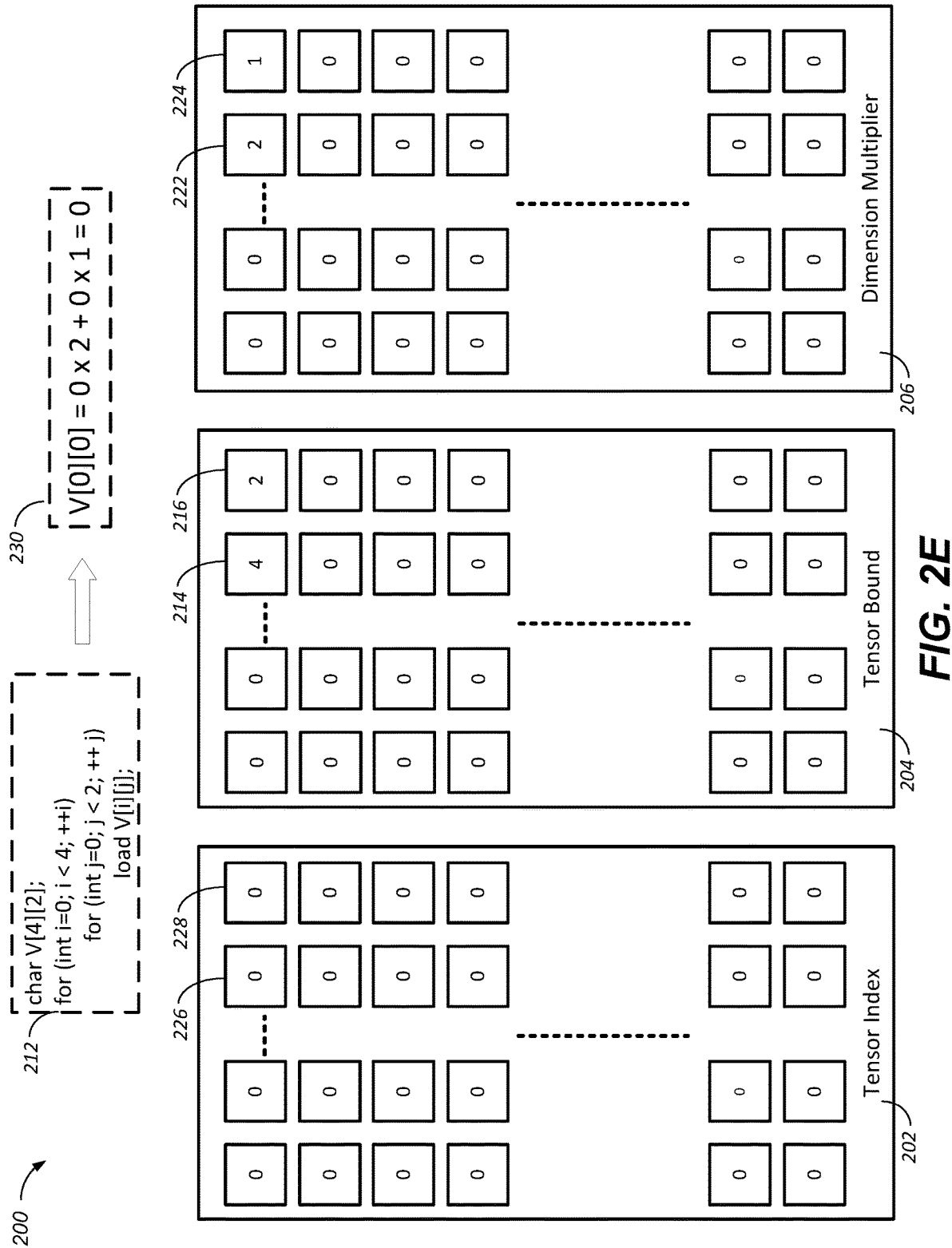

FIG. 2E illustrates accessing the element V[0][0] according to the program 212. For example, the processor may execute an instruction "Locate Tensor" that locates a memory address that corresponds to the element being accessed. In some implementations, the instruction may include a base memory address. For example, the instruction "LocateTensor" may include a memory address of the element V[0][0] that is the first element of the variable V. In some implementations, the instruction may include a row number corresponding to a tensor to be accessed. For example, the instruction "LocateTensor" may include a row number corresponding to the variable V. Here, the row number is 1.

In some implementations, in response to receiving the instruction, an arithmetic logic unit (e.g., the arithmetic logic unit 106) determines a memory address offset by calculating a sum of the multiplicative product between values stored in each of the tensor index elements 202 and values stored in the corresponding dimension multiplier elements 206. Here, an arithmetic logic unit multiplies the value stored in element $X_{1,N}$ by the value stored in element $Z_{1,N}$, the value stored in element by the value stored in element $Z_{1,N-1}$, ..., the value stored in element $X_{1,2}$ by the value stored in element $Z_{1,2}$, and the value stored in element $X_{1,1}$ by the value stored in element $Z_{1,1}$. The arithmetic logic unit then sums all the multiplied products together to determine the memory address that corresponds to the element being accessed. Since all values in the tensor index elements 202 are zero, the memory address offset is zero, as indicated by the box 230. The processor can then access the element V[0][0] by adding the base memory address (i.e., P) to the memory address offset (i.e., 0) to determine a memory address, and accessing the stored data in the storage medium based on the determined memory address.

Figure 2F:
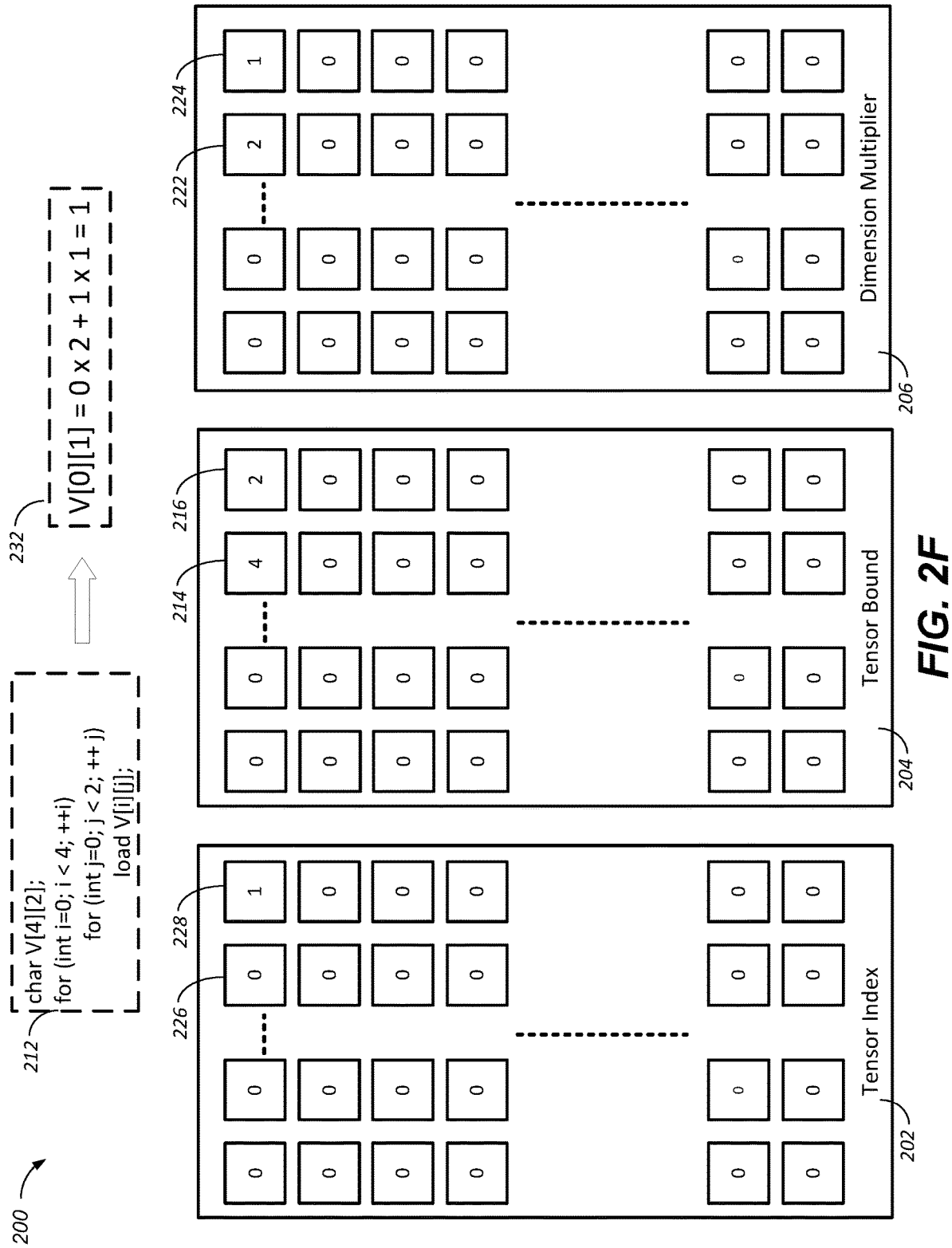

FIG. 2F illustrates accessing the element V[0][1] according to the program 212. For example, after the program has iterated through first inner loop, the nested loop index variables are updated (i.e., 1=0 and j=0), the processor may execute an instruction "IterateTensor" that updates the tensor index elements 202 as the program enters the second inner loop (i.e., 1=0 and j=1). In some implementations, the tensor traversal unit updates the tensor index elements 202 by incrementing the tensor index element having the lowest index by a predetermined value. For example, referring to FIG. 2F, the tensor traversal unit may increment the tensor index element 228 (i.e., $X_{1,1}$) by 1. In some other implementations, the tensor traversal unit may update the tensor index elements 202 by decrementing the tensor index element having the lowest index by a predetermined value.

In some implementations, the tensor traversal unit compares the updated values in the tensor index elements 202 with the values in the tensor bound elements 204, and determines whether a threshold has been satisfied. For example, the tensor traversal unit may compare the updated value (i.e., 1) in the tensor index element 228 with the value (i.e., 2) in the tensor bound element 216, and determines whether the updated value in the tensor index element 228 is smaller than the value in the tensor bound element 216. Here, the updated value in the tensor index element 228 is smaller than the value in the tensor bound element 216, and the updated value in the tensor index element 228 remains 1.

The processor can then access the element V[0][1] by executing the instruction "LocateTensor" to locate the memory address that corresponds to V[0][1]. Referring to FIG. 2F, all values in the tensor index elements 202 except the tensor index element 228 are zero. The tensor index element 228 has a value of 1, and the arithmetic logic unit may determine that the memory address offset is 1, as indicated by the box 232. The processor can then access the element V[0][1] by adding the base memory address (i.e., P) to the memory address offset (i.e., 1) to determine a memory address, and accessing the stored data in the storage medium based on the determined memory address.

Figure 2G:
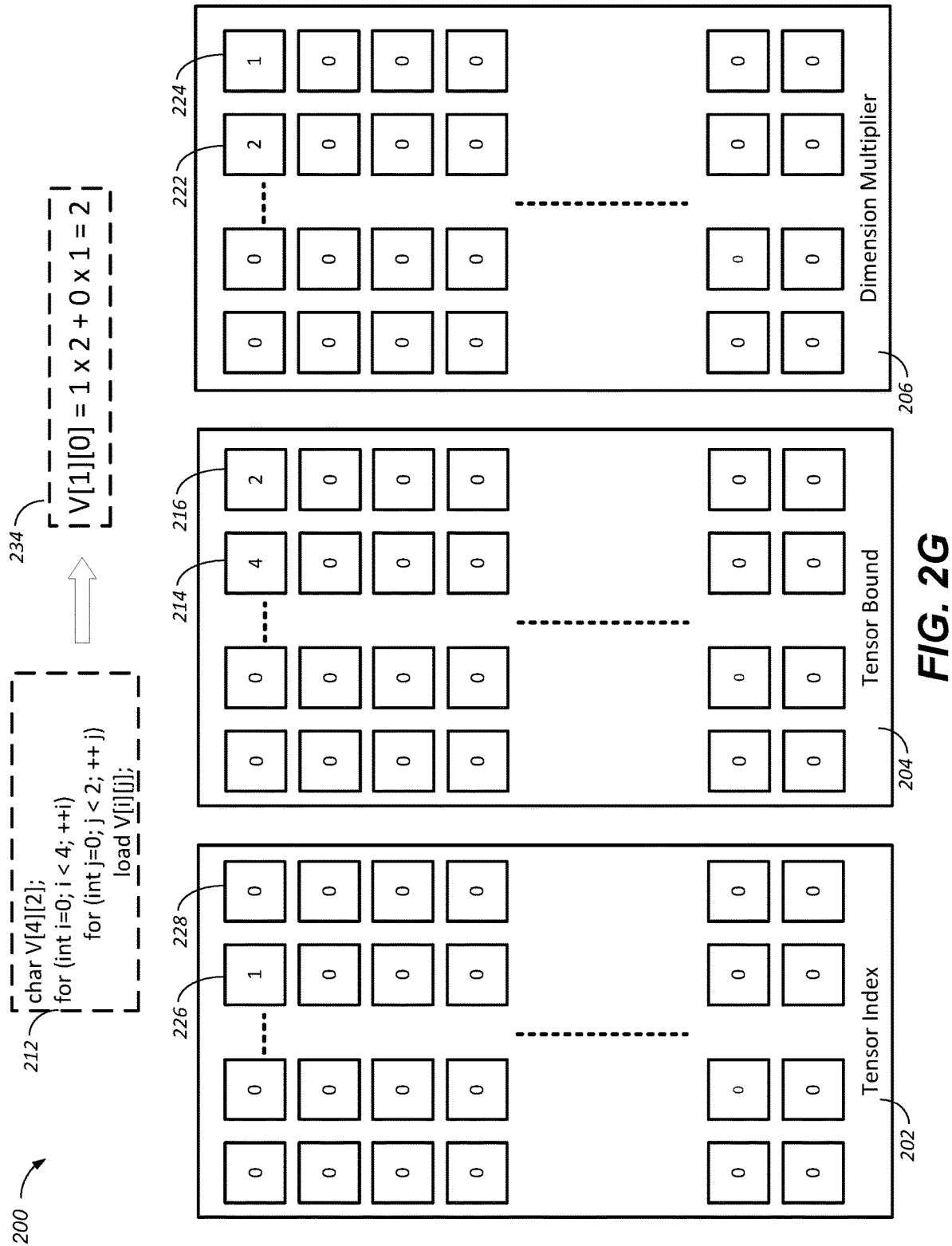

FIG. 2G illustrates accessing the element V[1][0] according to the program 212. For example, after the program has iterated through inner loop for the second time, the nested loop index variables are updated (i.e., 1=1 and 1=0), and the processor may execute an instruction "IterateTensor" that updates the tensor index elements 202. For example, the tensor traversal unit may increment the tensor index element 228 (i.e., $X_{1,1}$) by 1. The tensor traversal unit may compare the updated value (i.e., 2) in the tensor index element 228 with the value (i.e., 2) in the tensor bound element 216, and determines that the updated value in the tensor index element 228 is not smaller than the value in the tensor bound element 216. In some implementations, in response to determining that the threshold has not been satisfied, the tensor traversal unit may carry over the updated value to the next tensor index element and reset the current tensor index element. For example, since the updated value in the tensor index element 228 is not smaller than the value in the tensor bound element 216, the tensor traversal unit may increment the tensor index element 226 by 1, and reset the tensor index element 228 back to 0.

The processor can then access the element V[1][0] by executing the instruction "LocateTensor" to locate the memory address that corresponds to V[1][0]. Referring to FIG. 2G, all values in the tensor index elements 202 except the tensor index element 226 are zero. The tensor index element 226 has a value of 1, and the arithmetic logic unit may determine that the memory address offset is 2, as indicated by the box 234. The processor can then access the element V[1][0] by adding the base memory address (i.e., P) to the memory address offset (i.e., 2) to determine a memory address, and accessing the stored data in the storage medium based on the determined memory address.

Figure 2H:
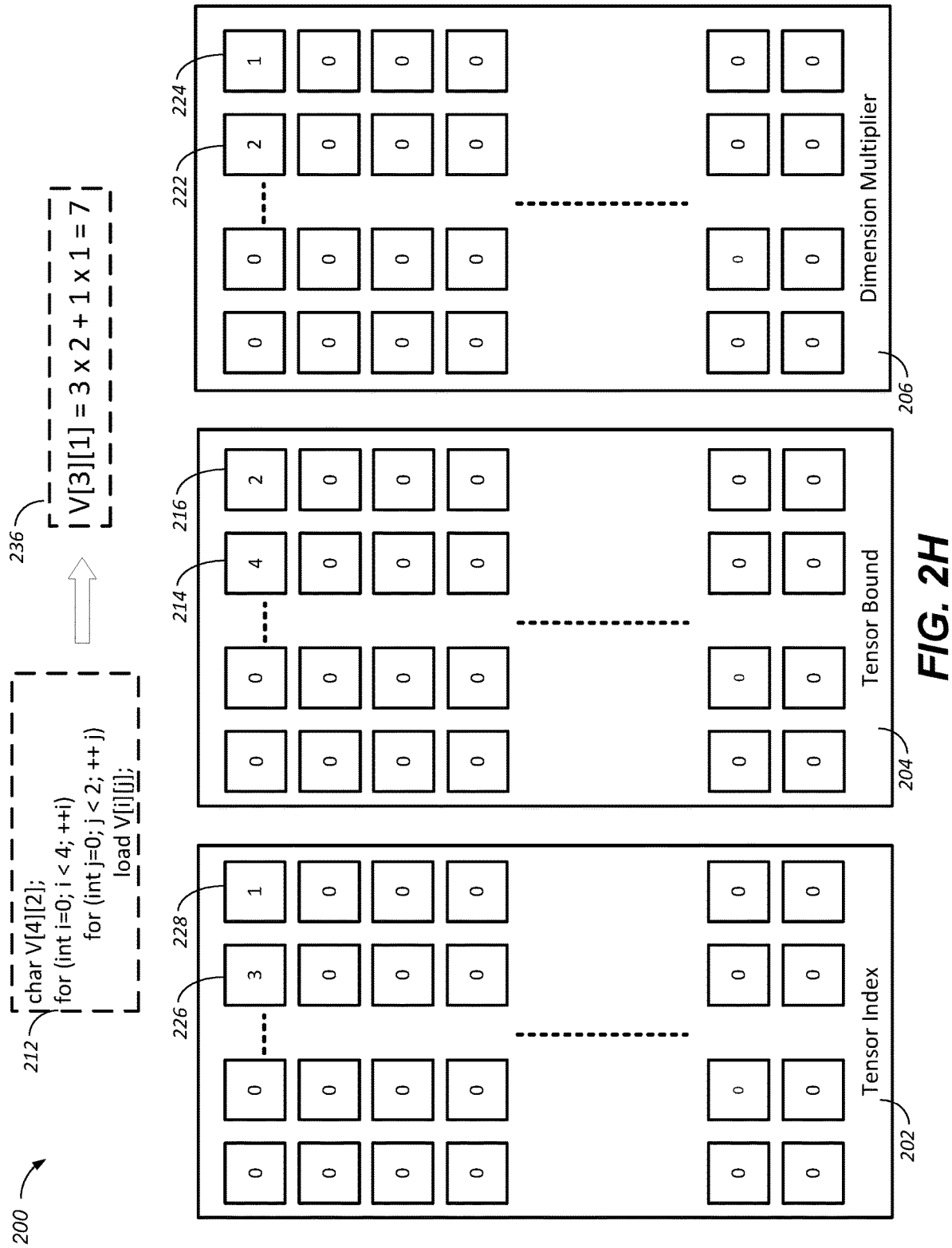

FIG. 2H illustrates accessing the element V[3][1] according to the program 212. For example, the program may continue to iterate through the inner loop and the outer loop until the nested loop index variables are at their upper bound (i.e., i=3 and j=1). The processor can access the element V[3][1] by executing the instruction "LocateTensor" to locate the memory address that corresponds to V[3][1]. Referring to FIG. 2H, all values in the tensor index elements 202 except the tensor index elements 226 and 228 are zero. The tensor index element 226 has a value of 3, and the tensor index element 228 has a value of 1. The arithmetic logic unit may determine that the memory address offset is 7, as indicated by the box 236. The processor can then access the element V[3][1] by adding the base memory address (i.e., P) to the memory address offset (i.e., 7) to determine a memory address, and accessing the stored data in the storage medium based on the determined memory address.

The processor may then execute the instruction "IterateTensor" that updates the tensor index elements 202. For example, the tensor traversal unit may increment the tensor index element 228 (i.e., $X_{1,1}$) by 1. The tensor traversal unit may compare the updated value (i.e., 2) in the tensor index element 228 with the value (i.e., 2) in the tensor bound element 216, and determines that the updated value in the tensor index element 228 is not smaller than the value in the tensor bound element 216. Since the updated value in the tensor index element 228 is not smaller than the value in the tensor bound element 216, the tensor traversal unit may increment the tensor index element 226 by 1, and reset the tensor index element 228 back to 0. The tensor traversal unit may compare the updated value (i.e., 3+1=4) in the tensor index element 226 with the value (i.e., 4) in the tensor bound element 214, and determines that the updated value in the tensor index element 226 is not smaller than the value in the tensor bound element 214. Since the updated value in the tensor index element 226 is not smaller than the value in the tensor bound element 214, the tensor traversal unit may increment the next tensor index element (i.e. $X_{1,3}$) by 1, and reset the tensor index element 226 back to 0. However, since the corresponding tensor bound element (i.e., $Y_{1,3}$) is 0, the threshold is not satisfied. The tensor traversal unit will continue resetting the first row of the tensor index elements 202 until all of the tensor index elements at the first row are reset to 0.

In the example described above in references to FIGS. 2B-2H, the order of the tensor traversal for the element V is V[0][0], V[0][1], V[1][0], V[1][1], V[2][0], V[2][1], V[3][0], and V[3][1]. In some implementations, a program may traverse the element V in the order of V[0][0], V[1][0], V[2][0], V[3][0], V[0][1], V[1][1], V[2][1], and V[3][1], by setting tensor bound information in the element 214 (i.e., $Y_{1,2}$) to 2 and the element 216 (i.e., $Y_{1,1}$) to 4, and by setting the dimension multiplier information in the element 222 (i.e., $Z_{1,2}$) is set to 1 and the element 224 (i.e., $Z_{1,1}$) is set to 2.

Figure 3:
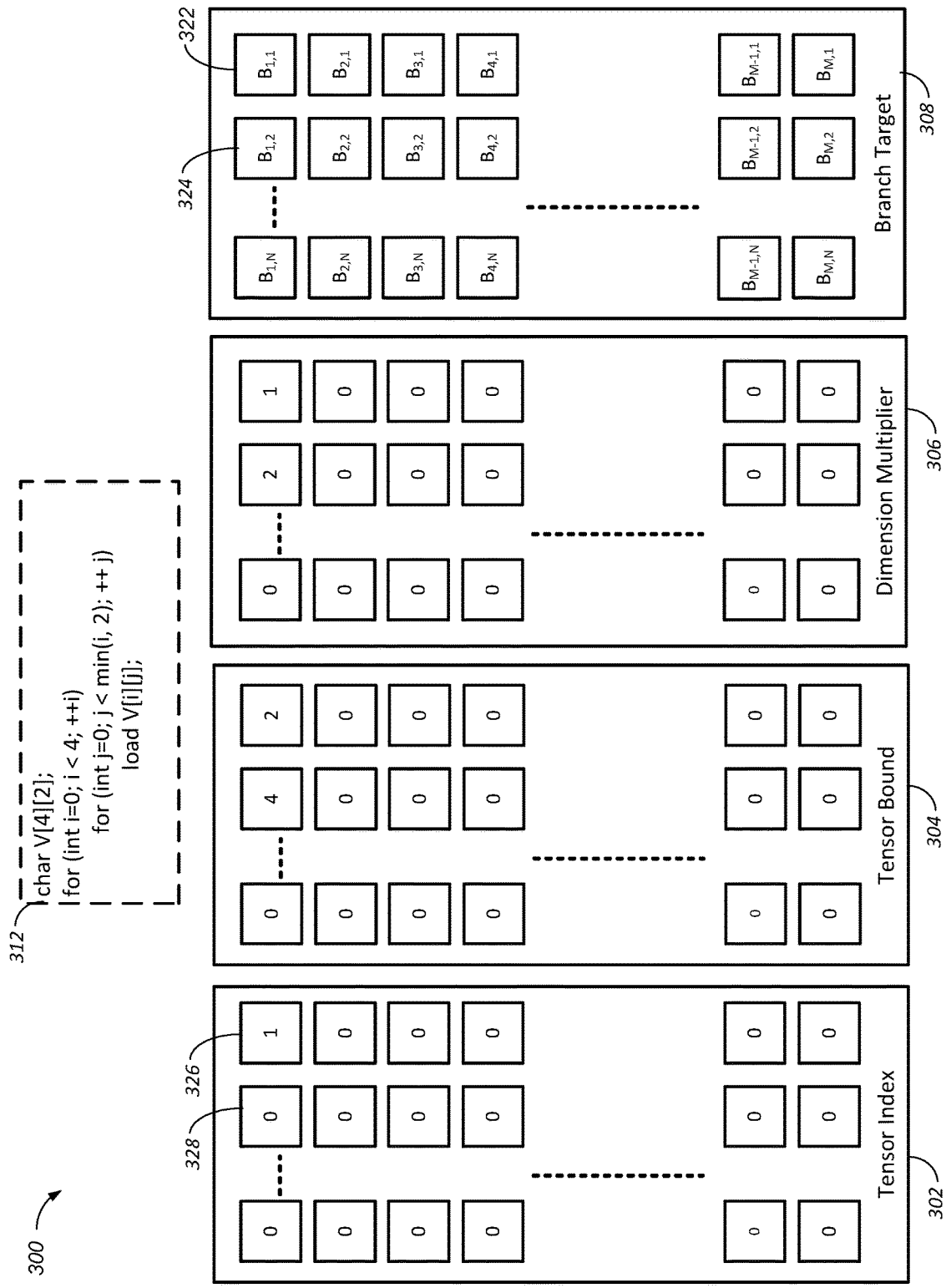
FIG. 3 illustrates an example tensor traversal unit.

FIG. 3 shows an example set of tensor status elements 300 of a tensor traversal unit. The tensor status elements 300 may correspond to the tensor status elements 122 of the tensor traversal unit 106 or the tensor status elements 200. The tensor traversal unit 300 includes a group of tensor index elements 302, a group of tensor bound elements 304, a group of dimension multiplier elements 306, and a group of branch target elements 308. The branch target elements 308 may be physically or logically arranged as a 2-D array, where each element of the branch target elements 308 has a corresponding element in the tensor index elements 302. In some implementations, each row of the branch target elements 308 may represent branch target information for a tensor. In some implementations, each column of the branch target elements 308 may represent branch target information for nested loop index variable values that are associated with a tensor. In some implementations, for a N-dimension tensor, where there are N columns for the tensor index elements 302, the tensor bound elements 304, and the dimension multiplier elements 306, there may be N+1 columns of corresponding branch targets 308 because there are N+1 cases for meeting the bounds threshold.

In some implementations, branch target information may include a memory address of an instruction that is to be executed by a processor upon the completion of a loop iteration in a nested loop. For example, when the value in a tensor index element is updated, the processor may execute an instruction according to the memory address stored in the corresponding branch target element. Referring to FIG. 3, a program 312 may be stored in the storage medium 104 or another storage medium that can be executed by the processing unit 102. The program 312 specifies a character array variable V having a first dimension of 4 and a second dimension of 2. The program 312 specifies a nested for-loop for traversing the variable V, where the for-loop traverses the first dimension of V in an outer loop tracked by a nested loop index variable i, and traverses the second dimension of V in an inner loop tracked by a nested loop index variable j. The program 312 also specifies a condition for exiting the inner loop, which requires the processor to execute a minimum function instruction to compare the current value of the nested loop index variable i and the number 2. In some implementations, the memory address of the minimum function instruction may be stored in the branch target element 324, such that in the event that there is a carry-over from the tensor index element 326 to the tensor index element 328, the minimum function instruction will be executed by the processor to determine the branch condition for the inner loop and to set the tensor bound information for the inner loop. Similarly, the memory address of a different instruction may be stored in the branch target element 322, such that in the event that there is an increment in the tensor index element 326 without having a carry-over to the tensor index element 328, the different instruction will be executed by the processor.

Figure 4:
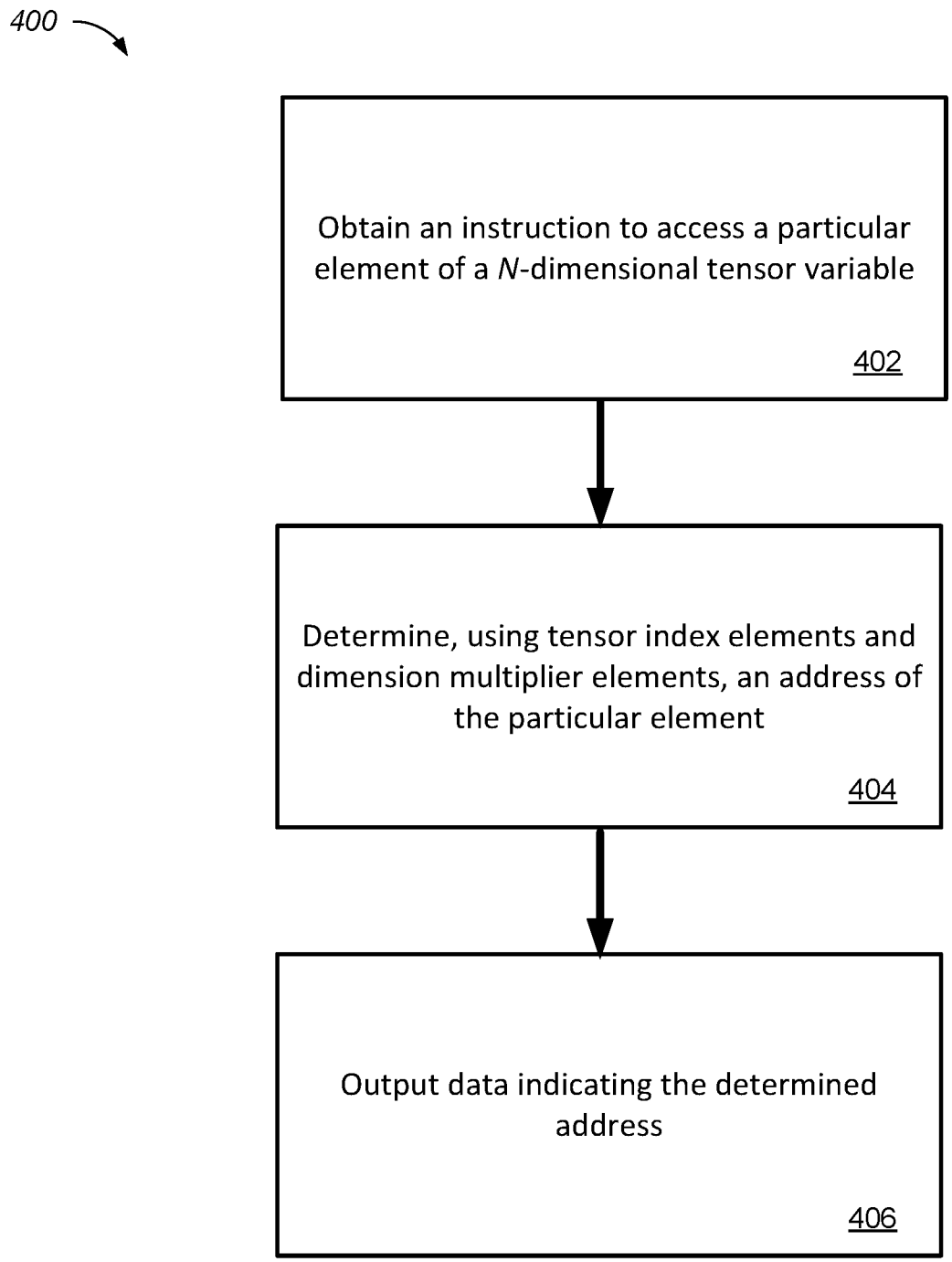
FIG. 4 is a flow diagram that illustrates an example of a process for determining an address of a multi-dimensional tensor variable.

FIG. 4 is a flow diagram that illustrates an example of a process 400 for determining an address of a multi-dimensional tensor variable. The process 400 may be performed by a system of one or more computers, e.g., the computing system 100. The system includes a tensor traversal unit having multiple tensor index elements and multiple dimension multiplier elements, where each of the dimension multiplier elements has a corresponding tensor index element. In some implementations, the system may include multiple tensor bound elements, where each of the multiple tensor bound elements may have a corresponding tensor index element in the multiple tensor index elements. In some implementations, the system includes one or more arithmetic logic units.

The system obtains an instruction to access a particular element of a N-dimensional tensor, where the N-dimensional tensor has multiple elements arranged across each of the N dimensions, and where N is an integer that is equal to or greater than one (402). For example, the processing unit 102 may execute an instruction for accessing a particular element of a tensor.

In some implementations, the instruction may represent an instruction for processing a nested loop that includes a first loop and a second loop that is an outer loop of the first loop, where the first loop is iterated using a first index variable, and where the second loop is iterated using a second index variable. For example, a program 212 may be stored in the storage medium 104 or another storage medium that can be executed by the processing unit 102. The program 212 may specify a character array variable V having a first dimension of 4 and a second dimension of 2. The program 212 may specify a nested for-loop for traversing the variable V, where the for-loop traverses the first dimension of V in an outer loop tracked by a nested loop index variable i, and traverses the second dimension of V in an inner loop tracked by a nested loop index variable j.

The system determines, using one or more tensor index elements of multiple tensor index elements and one or more dimension multiplier elements of multiple dimension multiplier elements, an address of the particular element (404). In some implementations, the address of the particular element may be an address offset from another element of the N-dimensional tensor. For each tensor index element of the one or more tensor index elements, the system may multiply a value stored in the respective tensor index element by a value stored in the corresponding tensor index element of the one or more multiple tensor index elements to generate a respective multiplied value. The system may determine the address offset by determining a sum of the multiplied values. For example, an arithmetic logic unit (e.g., the arithmetic logic unit 106) may determine a memory address offset by calculating a sum of the multiplicative product between values stored in each of the tensor index elements 202 and values stored in the corresponding dimension multiplier elements 206.

In some implementations, the system may set values stored in the multiple tensor index elements, the multiple dimension multiplier elements, and the multiple tensor bound elements to an initialization value. For example, a processor may execute an instruction "InitializeElements" that initialize the tensor status elements 200. After initialization, each element of the tensor status elements 200 may be set to zero.

In some implementations, the system may set a value stored in a first tensor bound element of the multiple tensor bound elements to an upper bound value of the first index variable for iterating the first loop. The system may set a value stored in a second tensor bound element of the multiple tensor bound elements to an upper bound value of the second index variable for iterating the second loop. For example, a processor may execute an instruction "InitializeElements" that initialize the tensor status elements 200. After initialization, each element of the tensor status elements 200 may be set to zero. The system may set a value stored in a first dimension multiplier element of the multiple dimension multiplier elements to a predetermined value. The system may set a value stored in a second dimension multiplier element of the multiple dimension multiplier elements to the upper bound value of the first index variable. For example, a processor may execute an instruction "SetTensorBound" that sets tensor bound information in the tensor bound elements 204. After setting tensor bound information in the tensor bound elements 204, the element 214 (i.e., $Y_{1,2}$) is set to 4, and the element 216 (i.e., $Y_{1,1}$) is set to 2.

In some implementations, the system may set a value stored in a first tensor index element of the multiple tensor index elements to a current value of the first index variable. The system may set a value stored in a second tensor index element of the multiple tensor index elements to a current value of the second index variable. The system may multiply the value stored in the first dimension multiplier element by the value stored in the first tensor index element to obtain a first multiplied value. The system may multiply the value stored in the second dimension multiplier element by the value stored in the second tensor index element to obtain a second multiplied value. The system may determine the address by at least summing the first multiplied value and the second multiplied value. For example, an arithmetic logic unit multiplies the value stored in element $X_{1,N}$ by the value stored in element $Z_{1,N}$, the value stored in element $X_{1,N-1}$ by the value stored in element $Z_{1,N-1}$, ..., the value stored in element $X_{1,2}$ by the value stored in element $Z_{1,2}$, and the value stored in element $X_{1,1}$ by the value stored in element $Z_{1,1}$. The arithmetic logic unit then sums all the multiplied products together to determine the memory address that corresponds to the element being accessed.

In some implementations, the system may receive an instruction to update the value stored in the first tensor index element. For example, the processor may execute an instruction "IterateTensor" that updates the tensor index elements 202. After receiving the instruction to update the value stored in the first tensor index element, the system may determine that a difference between the value stored in the first tensor index element and the value stored in the first tensor bound element satisfies a threshold. In response to determining that the difference between the value stored in the first tensor index element and the value stored in the first tensor bound element satisfies the threshold, the system may update the value stored in the first tensor index element. For example, referring to FIG. 2F, the tensor traversal unit may increment the tensor index element 228 (i.e., $X_{1,1}$) by 1. The updated value in the tensor index element 228 is smaller than the value in the tensor bound element 216, and the updated value in the tensor index element 228 remains 1

In some implementations, the first index variable may be incremented by a first incremental value each time the first loop completes. The system may increment the value stored in the first tensor index element by the first incremental value. For example, after the program enters the second inner loop (i.e., i=0 and j=1), the tensor traversal unit may increment the tensor index element 228 (i.e., $X_{1,1}$) by 1.

In some implementations, the system may receive an instruction to update the value stored in the first tensor index element. For example, the processor may execute an instruction "IterateTensor" that updates the tensor index elements 202. After receiving the instruction to update the value stored in the first tensor index element, the system may determine that a difference between the value stored in the first tensor index element and the value stored in the first tensor bound element does not satisfy a threshold. In response to determining that the difference between the value stored in the first tensor index element and the value stored in the first tensor bound element does not satisfy the threshold, the system may reset the value stored in the first tensor index element, and update the value stored in the second tensor index element. For example, the tensor traversal unit may increment the tensor index element 228 (i.e., $X_{1,1}$) by 1. The tensor traversal unit may compare the updated value (i.e., 2) in the tensor index element 228 with the value (i.e., 2) in the tensor bound element 216, and determines that the updated value in the tensor index element 228 is not smaller than the value in the tensor bound element 216. Since the updated value in the tensor index element 228 is not smaller than the value in the tensor bound element 216, the tensor traversal unit may increment the tensor index element 226 by 1, and reset the tensor index element 228 back to 0.

In some implementations, the second index variable may be incremented by a second incremental value each time the second loop completes. The system may increment the value stored in the second tensor index element by the second incremental value. For example, after the program enters the next loop of the outer loop (i.e., i=1 and j=0), the tensor traversal unit may increment the tensor index element 226 (i.e., $X_{1,2}$) by 1.

The system outputs data indicating the determined address for accessing the particular element of the N-dimensional tensor (406). For example, the processing unit 102 may access, using a memory address offset value, a particular element of a N-dimensional array variable in the storage medium.

In some implementations, the system includes multiple branch target elements, where each of the multiple branch target elements has a corresponding tensor index element in the multiple tensor index elements, and where each of the multiple branch target elements is configured to store an address for an instruction to be executed upon a completion of an iteration of a loop that corresponds to the respective branch target element. For example, the tensor traversal unit 300 includes a group of branch target elements 308 that store branch target information. Branch target information may include a memory address of an instruction that is to be executed by a processor upon the completion of a loop iteration in a nested loop.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. An apparatus for determining memory addresses for elements of tensors comprising an N-dimensional tensor, the apparatus comprising:
    storage circuitry comprising:
        a first two-dimensional array of tensor index elements configured to store index values for loops used to traverse the dimensions of the N-dimensional tensor, wherein the first two-dimensional array of tensor index elements included;
            for each dimension of the N-dimensional tensor, a first tensor index element configured to store the index value for the dimension; and
            for each of one or more additional tensors, a corresponding subarray of tensor index elements that includes, for each dimension of the additional tensor, a second tensor index element configured to store an index value for the dimension of the additional tensor; and
        a second two-dimensional array of dimension multiplier elements configured to store multiplier values, wherein the second two-dimensional array includes, for each dimension of the N-dimensional tensor, a first dimension multiplier element configured to store the multiplier value for the dimension; and
    digital circuitry configured to perform arithmetic and logic operations and further configured to determine memory addresses for elements of the N-dimensional tensor, including:
        obtaining a current index value stored by each first tensor index element of the first two-dimensional array;
        determining, using the current index value stored by each first tensor index element of the first two-dimensional array and the multiplier value stored by each first dimension multiplier element of the second two-dimensional array, a memory address at which a particular element of the tensor is stored in memory, the determining including:
            determining, for each dimension of the N-dimensional tensor, a product of (i) the current index value for the dimension and (ii) the multiplier value for the dimension; and
            determining the memory address of the particular element based on a sum of the product for each dimension of the N-dimensional tensor;
        outputting data indicating the determined memory address to a processing unit that is configured to access the particular element of the N-dimensional tensor using the determined memory address; and
        updating, for one or more of the dimensions for the N-dimensional tensor, the index value for the dimension prior to determining a memory address for a next element for the N-dimensional tensor.

2. The apparatus of claim 1, wherein the first two-dimensional array of tensor index elements further includes, for each tensor, a respective row of tensor index elements for the tensor.

3. The apparatus of claim 1, wherein the second two-dimensional array of dimension multiplier elements further includes, for each of the one or more additional tensors, a corresponding second subarray of second dimension multiplier elements that includes, for each dimension of the additional tensor, a second dimension multiplier element configured to store a multiplier value for the dimension of the additional tensor.

4. The apparatus of claim 3, wherein the second two-dimensional array of dimension multiplier elements further includes, for each tensor, a respective row of dimension multiplier elements for the tensor.

5. The apparatus of claim 1, further comprising a third two-dimensional array of tensor bound elements configured to store a loop bound for the N-dimensional tensor, wherein the third two-dimensional array of tensor bound elements includes, for each dimension of the N-dimensional tensor, a tensor bound element configured to store the loop bound for the dimension.

6. The apparatus of claim 5, wherein updating, for one or more of the dimensions for the N-dimensional tensor, the index value for the dimension prior to determining a memory address for a next element for the N-dimensional tensor comprises:
for a first dimension of the N-dimensional tensor:
comparing the index value for the first dimension to the tensor bound for the first dimension;
whenever the index value for the first dimension matches the tensor bound for the first dimension, resetting the index value for the first dimension to an initial value for the first dimension; and
whenever the index value for the first dimension is less than the tensor bound for the first dimension, incrementing the index value for the dimension.

7. The apparatus of claim 1, wherein:
the first two-dimensional array of tensor index elements comprises a first logical array of the tensor index elements; and
the second two-dimensional array of dimension multiplier elements comprises a second logical array of the dimension multiplier elements.

8. A system comprising:
one or more hardware processors configured to perform linear algebra operations on tensors comprising an N-dimensional tensor, wherein the N-dimensional tensor has data elements arranged across each of the N dimensions, and wherein N is an integer equal to or greater than two;
storage circuitry comprising:
a first two-dimensional array of tensor index elements configured to store index values for loops used to traverse the dimensions of the N-dimensional tensor, wherein the first two-dimensional array of tensor index elements includes:
for each dimension of the N-dimensional tensor, a tensor index element configured to store the index value for the dimension; and
for each of one or more additional tensors, a corresponding subarray of tensor index elements that includes, for each dimension of the additional tensor, a second tensor index element configured to store an index value for the dimension of the additional tensor; and
a second two-dimensional array of dimension multiplier elements configured to store multiplier values, wherein the second two-dimensional array includes, for each dimension of the N-dimensional tensor, a first dimension multiplier element configured to store the multiplier value for the dimension; and digital circuitry configured to perform arithmetic and logic operations and further configured to determine memory addresses for elements of the N-dimensional tensor, including:
obtaining a current index value stored by each first tensor index element of the first two-dimensional array;
determining, using the current index value stored by each first tensor index element of the first two-dimensional array and the multiplier value stored by each first dimension multiplier element of the second two-dimensional array, a memory address at which a particular element of the tensor is stored in memory, the determining including:
determining, for each dimension of the N-dimensional tensor, a product of (i) the current index value for the dimension and (ii) the multiplier value for the dimension; and
determining the memory address of the particular element based on a sum of the product for each dimension of the N-dimensional tensor;
outputting data indicating the determined memory address to a processing unit that is configured to access the particular element of the N-dimensional tensor using the determined memory address; and
updating, for one or more of the dimensions for the N-dimensional tensor, the index value for the dimension prior to determining a memory address for a next element for the N-dimensional tensor.

9. The system of claim 8, wherein the first two-dimensional array of tensor index elements further includes, for each tensor, a respective row of tensor index elements for the tensor.

10. The system of claim 8, wherein the second two-dimensional array of dimension multiplier elements further includes, for each of the one or more additional tensors, a corresponding second subarray of second dimension multiplier elements that includes, for each dimension of the additional tensor, a second dimension multiplier element configured to store a multiplier value for the dimension of the additional tensor.

11. The system of claim 10, wherein the second two-dimensional array of dimension multiplier elements further includes, for each tensor, a respective row of dimension multiplier elements for the tensor.

12. The system of claim 8, further comprising a third two-dimensional array of tensor bound elements configured to store a loop bound for the N-dimensional tensor, wherein the third two-dimensional array of tensor bound elements includes, for each dimension of the N-dimensional tensor, a tensor bound element configured to store the loop bound for the dimension.

13. The system of claim 12, wherein updating, for one or more of the dimensions for the N-dimensional tensor, the index value for the dimension prior to determining a memory address for a next element for the N-dimensional tensor comprises:
for a first dimension of the N-dimensional tensor:
comparing the index value for the first dimension to the tensor bound for the first dimension;
whenever the index value for the first dimension matches the tensor bound for the first dimension, resetting the index value for the first dimension to an initial value for the first dimension; and
whenever the index value for the first dimension is less than the tensor bound for the first dimension, incrementing the index value for the dimension.

14. The system of claim 8, wherein:
the first two-dimensional array of tensor index elements comprises a first logical array of the tensor index elements; and
the second two-dimensional array of dimension multiplier elements comprises a second logical array of the dimension multiplier elements.

15. A method performed by one or more data processing apparatus for determining memory addresses for elements of tensors including an N-dimensional tensor, the method comprising:
obtaining, by digital circuitry of the data processing apparatus and from storage circuitry comprising a first two-dimensional array of tensor index elements configured to store index values for loops used to traverse the dimensions of the N-dimensional tensor, a current index value stored by each first tensor index element, wherein the first two-dimensional array of tensor index elements includes:
for each dimension of the N-dimensional tensor, a corresponding first tensor index element configured to store the index value for the dimension, and wherein the digital circuitry is configured to perform arithmetic and logic operations; and
for each of one or more additional tensors, a corresponding subarray of tensor index elements that includes, for each dimension of the additional tensor, a second tensor index element configured to store an index value for the dimension of the additional tensor;
determining, by the digital circuitry and using the current index value stored by each tensor index element of the first two-dimensional array and a multiplier value stored by each first dimension multiplier element of a second two-dimensional array of multiplier elements of the storage circuitry, a memory address at which a particular element of the tensor is stored in memory, wherein the second two-dimensional array of dimension multiplier elements is configured to store multiplier values, wherein the second two-dimensional array includes, for each dimension of the N-dimensional tensor, a corresponding first dimension multiplier element configured to store the multiplier value for the dimension, the determining including:
determining, for each dimension of the N-dimensional tensor, a product of (i) the current index value for the dimension and (ii) the multiplier value for the dimension; and
determining the memory address of the particular element based on a sum of the product for each dimension of the N-dimensional tensor;
outputting data indicating the determined memory address to a processing unit that is configured to access the particular element of the N-dimensional tensor using the determined memory address; and
updating, for one or more of the dimensions for the N-dimensional tensor, the index value for the dimension prior to determining a memory address for a next element for the N-dimensional tensor.

16. The method of claim 15, wherein the first two-dimensional array of tensor index elements further includes, for each tensor, a respective row of tensor index elements for the tensor.

17. The method of claim 15, wherein the second two-dimensional array of dimension multiplier elements further includes, for each of the one or more additional tensors, a corresponding second subarray of second dimension multiplier elements that includes, for each dimension of the additional tensor, a second dimension multiplier element configured to store a multiplier value for the dimension of the additional tensor.

18. The method of claim 17, wherein the second two-dimensional array of dimension multiplier elements further includes, for each tensor, a respective row of dimension multiplier elements for the tensor.

19. The method of claim 15, wherein the data processing apparatus includes a third two-dimensional array of tensor bound elements configured to store a loop bound for the N-dimensional tensor, wherein the third two-dimensional array of tensor bound elements includes, for each dimension of the N-dimensional tensor, a tensor bound element configured to store the loop bound for the dimension.

20. The method of claim 15, wherein:
the first two-dimensional array of tensor index elements comprises a first logical array of the tensor index elements; and
the second two-dimensional array of dimension multiplier elements comprises a second logical array of the dimension multiplier elements.

* * * * *